UNITED STATES PATENT OFFICE.

ERNST LEONHARDT, OF BÄRWINKEL, NEAR NEUHARDENBERG, GERMANY, ASSIGNOR TO GEBR. HEYL & CO. AKTIEN-GESELLSCHAFT, OF CHARLOTTENBURG, NEAR BERLIN, GERMANY.

PROCESS OF MAKING A DISINFECTANT.

1,001,964.  Specification of Letters Patent.  Patented Aug. 29, 1911.

No Drawing.   Application filed November 6, 1909.  Serial No. 526,606.

*To all whom it may concern:*

Be it known that I, ERNST LEONHARDT, a subject of the King of Prussia, and resident of Bärwinkel, near Neuhardenberg, in the Province of Brandenburg, Germany, have invented a new Process of Making a Disinfectant, of which the following is a specification.

This invention relates to the production of a new disinfectant or purifier which differs from other means for the same purpose by the absence of almost all smell.

In carrying the invention into effect cresol containing at the utmost 10 per cent. phenol is mixed with a concentrated solution of copper acetate in water. This mixture is then distilled conveniently by steam heating so as to obtain a practical odorless cresol till 75 per cent. of the liquid has been distilled over. Preferably, the distillate is mixed with copper acetate in the proportion of 90% cresol to 10% concentrated solution of copper acetate, but I do not desire to limit myself to these proportions. The distillate obtained in this way is almost odorless and consists chiefly of cresol with only a small content of phenol. This distillate is now treated in the warm state with an acid aluminium sulfate e. g.

$$Al_2(SO_4)_3 1(H_2SO_4)$$

which is easily and completely dissolved. The excess acid is neutralized in its action by adding alumina-iron oxid $(Al_2O_3 Fe_2O_3)$. In this way a concentrated disinfectant is obtained which is practically odorless and forms a very permament emulsion with water. In this diluted form of course there is scarcely a trace of smell.

In practice it has been found convenient to employ an aqueous solution containing about ½ to 1% of the disinfectant.

The material obtained has considerable powers as a germ killer and in addition to being almost odorless it has the power of deodorizing materials which smell objectionably. Similarly sulfureted hydrogen, ammonium sulfate, ammonia, amine and acids (such as butyric acid) may be decomposed by the material according to the present invention, so that the places to be disinfected may be simultaneously rendered odorless. The new material may, on account of the qualities mentioned, be also used for preserving dungs and manures.

I claim:—

1. The method of preparing a disinfectant and purifying material consisting in distilling off a mixture of cresol containing at the utmost 10 per cent. of phenol with a concentrated solution of acetate of copper in water and then treating the distillate with an acid aluminum sulfate and neutralizing the excess acid.

2. The method of preparing a disinfectant and deodorizer consisting in distilling off a mixture of cresol containing up to 10% of phenol with a concentrated solution of acetate of copper in water, then treating the distillate with an acid aluminium sulfate, and neutralizing the excess acid by adding alumina-iron oxid.

In witness whereof I have hereunto set my hand in the presence of two witnesses.

ERNST LEONHARDT.

Witnesses:
  HENRY HASPER,
  WOLDEMAR HAUPT.